Dec. 30, 1930.  B. RUSSELL  1,787,394
ATTACHMENT FOR PERCOLATORS
Filed Jan. 24, 1930

Bennett Russell, INVENTOR
BY Victor J. Evans ATTORNEY

Patented Dec. 30, 1930

1,787,394

UNITED STATES PATENT OFFICE

BENNETT RUSSELL, OF HUNTINGTON, WEST VIRGINIA

ATTACHMENT FOR PERCOLATORS

Application filed January 24, 1930. Serial No. 423,211.

My present invention has reference to a coffee maker and my object is to provide the top of an ordinary coffee percolator with a receptacle having measure indicating marks on the face thereof and having minute perforations in the bottom thereof and whereby a determined amount of boiling water, indicated by the marks on the receptacle, is poured thereinto and allowed to drip therefrom onto the coffee in the reticulated receptacle therefor that is arranged in the pot of the percolator so that the slowly dripping water passing through the ground coffee in the percolator will produce drip coffee, while if added strength is required heat is applied to the bottom of the percolator pot to allow the coffee to percolate in the usual manner and also whereby drip or a combination of drip and percolated coffee may be easily brewed and the desired amount of such coffee ascertained by the quantity of water poured into the receptacle.

To the attainment of the foregoing the invention consists in certain other novel features of construction, combination and operative association of parts, one satisfactory embodiment of which is disclosed by the accompanying drawings.

Figure 1:
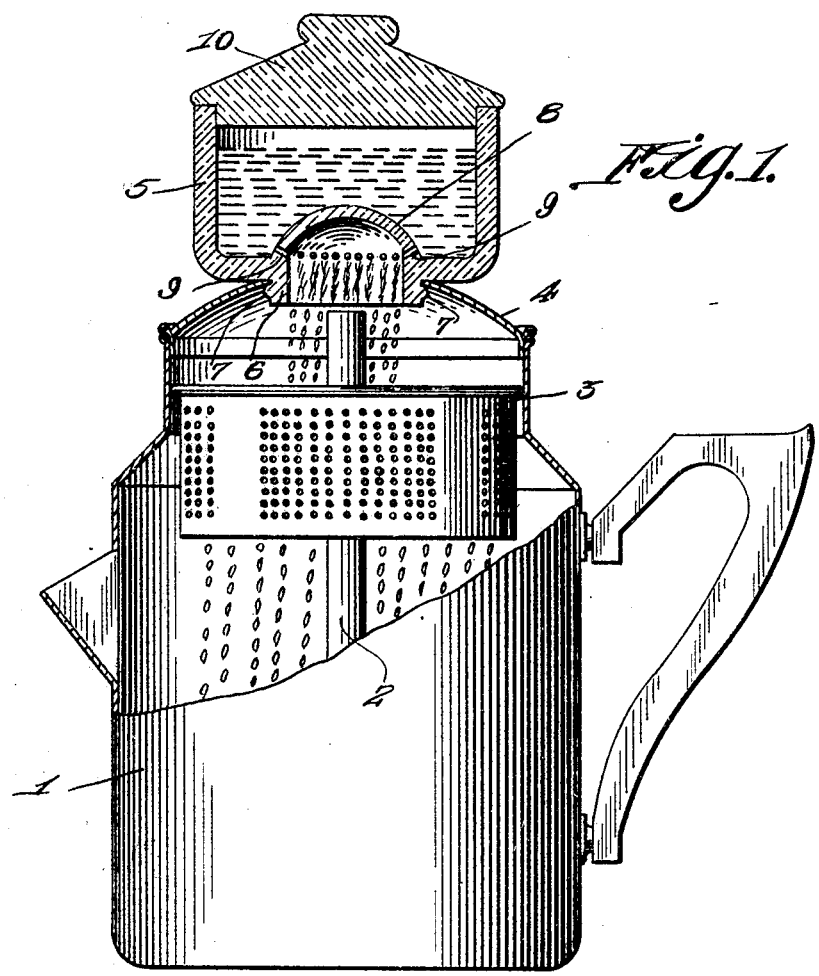
Figure 1 is a side elevation of an ordinary coffee percolator pot provided with the improvement, the latter and a part of the pot being in section.
Figure 2:
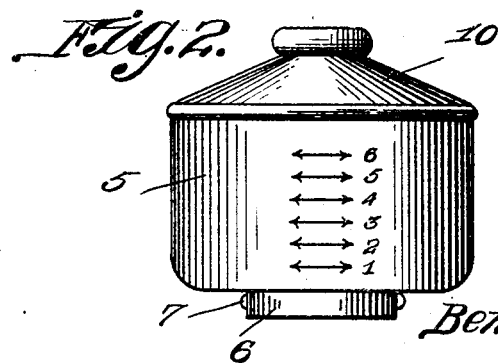
Fig. 2 is a side elevation of the improvement.

In the drawings the numeral 1 designates the pot of an ordinary coffee percolator. This pot has arranged therein the usual tube 2 on which is fixed the perforated ground coffee container 3. The top of the pot is indicated by the numeral 4. All of this is of the ordinary construction. Ordinarily the top 4 of the pot has the central opening therethrough closed by a glass cap for the ordinary and well known purpose and this cap has a neck extension provided with lugs that are inserted through notches that communicate with the opening, the cap being thereafter turned and thus held positioned on the top 4.

My improvement is in the nature of a receptacle 5, the same having on its bottom an annular flange or neck extension 6 provided with oppositely disposed lugs 7 to be passed through the mentioned notches and to permit of the receptacle being turned in the opening and held on the top 4. The flange or neck 6 merges into an arched or dome-shaped portion 8 which projects a suitable distance into the receptacle. The dome portion 8 is provided with an annular series of minute apertures 9 in a line with the inner wall of the bottom of the receptacle and which, of course, communicate with the flange or neck 6. The open mouth or top of the receptacle is closed by a cover 10. The desired quantity of ground coffee is placed in the coffee container or receptacle 3. The top of the receptacle 5 is removed and a desired quantity of boiling water is poured thereinto. Such quantity is determined by level indicating marks on the face of the receptacle 5. This amount can be almost accurately determined for the reason that the openings 9 are minute. The water drips through the openings into the coffee container 3 and the hot water filtering through the ground coffee draws or extracts most of the oil from the coffee so that drip coffee can be thus easily and quickly made with the improvement. Should it be found desirable to add strength to the coffee heat is applied to the bottom of the pot 1 which will result in the production of a combined drip and percolated coffee, as the coffee in the bottom of the pot will percolate back over the ground coffee in the perforated container 3 in the usual manner. Thus with my improvement it will be noted that I can produce a drip or combination drip and percolated coffee. The combination of coffee is superior to percolated coffee because the water passing through the coffee draws most of the oil therefrom before percolating and if allowed to percolate for a few minutes added strength can be gotten out of the coffee and the temperature of the coffee brought to almost boiling point.

Also with my construction it will be noted that no changes or alterations are made to the usual coffee percolator and it will be further noted that the improvement may be attached to any ordinary type of such percolators.

The receptacle and the top therefor may be constructed of glass, aluminum or of any other desired material.

Having described the invention, I claim:

1. An attachment for percolators including a percolating tube carrying a coffee container and an apertured cover disposed over the container and tube, a receptacle having a discharge neck secured in the apertured cover and disposed over the tube and container, means located in the receptacle about the neck to permit a comparatively slow discharge of hot water from the receptacle onto the coffee in the container and to direct the water away from the upper end of the tube, and a cover for the receptacle.

2. An attachment for a percolator including a percolating tube carrying a coffee container and an apertured cover disposed over the container and tube, a receptacle having a discharge neck secured in the apertured cover and disposed over the tube and container, a dome shaped wall forming a part of the bottom wall of the receptacle and having perforations arranged annularly about the base thereof to direct hot water from the receptacle to the coffee in the container and away from the upper end of the tube and providing a curved surface for water discharging from the tube to engage when employing the device as a percolator, and a cover for the receptacle.

In testimony whereof I affix my signature.

BENNETT RUSSELL.